United States Patent [19]

Taga

[11] 4,106,369
[45] Aug. 15, 1978

[54] OIL PRESSURE CONTROL SYSTEM FOR AN AUTOMATIC TRANSMISSION SYSTEM

[75] Inventor: Yutaka Taga, Toyota, Japan

[73] Assignee: Toyota Jidosha Kogyo Kabushiki Kaisha, Toyota, Japan

[21] Appl. No.: 620,269

[22] Filed: Oct. 7, 1975

[30] Foreign Application Priority Data

Dec. 23, 1974 [JP] Japan .................. 49-147901

[51] Int. Cl.$^2$ ............................................. B60K 21/00
[52] U.S. Cl. ........................................ 74/869; 74/868; 74/865
[58] Field of Search .................. 74/753, 865, 869, 868

[56] References Cited

U.S. PATENT DOCUMENTS

| 3,683,721 | 8/1972 | Uozumi et al. | 74/869 |
| 3,747,439 | 7/1973 | Uozumi et al. | 74/869 |
| 3,895,542 | 7/1975 | Migauchi | 74/868 |
| 3,937,107 | 2/1976 | Lentz | 74/865 |

Primary Examiner—Benjamin W. Wyche
Assistant Examiner—R. C. Turner
Attorney, Agent, or Firm—Birch, Stewart, Kolasch & Birch

[57] ABSTRACT

An oil pressure control system for an automatic transmission system which includes a fluid torque converter a transmission gear and friction engaging means adapted to be selectively supplied with line pressure for establishing a selected transmission engagement in said transmission gear, said oil pressure control system including a throttle pressure modulating valve which generates a throttle modulated pressure reduced from a throttle pressure, whereby a valve member of a speed shift valve incorporated in said oil pressure control system is shifted due to a balance between a governor pressure and said throttle or throttle modulated pressure to provide a hysteresis in shifting of said speed shift valve.

12 Claims, 4 Drawing Figures

OIL PRESSURE CONTROL SYSTEM FOR AN AUTOMATIC TRANSMISSION SYSTEM

BACKGROUND OF THE INVENTION

1. Field of the Invention

The present invention relates to an oil pressure control system for an automatic transmission system for use with automobiles.

2. Description of the Prior Art

In an automatic transmission system which includes a fluid torque converter, a transmission gear and friction engaging means for establishing a selected transmission engagement in said transmission gear, said automatic transmission system being controlled by an oil pressure control system said friction engaging means are engaged in various combinations by changing over of speed shift valves incorporated in said oil pressure control system in order to accomplish the most favorable transmission of power by said transmission gear according to the operational condition of the vehicle. The abovementioned changing over in the oil pressure control system is principally effected by a balance between a governor pressure which increases according to the increase of the vehicle speed and a counter acting force which is exerted by a spring force and/or a throttle pressure or other control pressures, said throttle pressure increasing according to increase of the engine torque, or particularly, of the throttle opening. In this case, if the same balancing condition is used for shifting said speed shift valves from a lower speed shift position (gear) to a higher speed shift position (gear) (upshifting), and for shifting same from a higher speed shift position (gear) to a lower speed shift position (gear) (downshifting), said upshifting and downshifting frequently occur when the vehicle is operated in the vicinity of the shifting point, thereby causing instability in operation of the automatic transmission system.

SUMMARY OF THE INVENTION

It is the primary object of the present invention to solve the abovementioned problem and to provide an improved oil pressure control system for an automatic transmission system for use with automobiles, wherein a determined hystersis is provided between the upshifting and downshifting of the speed shift valves in order to obtain stable operation of the transmission system.

According to the present invention, the abovementioned object is accomplished by an oil pressure control system for an automatic transmission system which includes a torque converter, a transmission gear and friction engaging means for establishing a selected transmission engagement in said transmission gear, comprising: a source of oil pressure; a line pressure regulating valve which generates a line pressure from an oil pressure of said source, said line pressure being regulated to be suitable for operating said friction engaging means; a throttle pressure regulation valve which generates a throttle pressure from said line pressure, said throttle pressure increasing as the engine torque increases; a governor pressure regulating valve which generates a governor pressure from said line pressure, said governor pressure increasing as the vehicle speed increases; a throttle pressure modulating valve which generates a throttle modulated pressure from said throttle pressure, said throttle modulated pressure being lower than said throttle pressure by a determined amount; a plurality of speed shift valves which are shifted between lower and higher speed shift positions for changing over the supply of oil pressure to said friction engaging means for shifting the transmission between lower and higher speed stages, said speed shift valve being shifted from said lower speed shift position to said higher speed shift position due to a balance between said governor pressure and said throttle pressure and shifted from said higher speed shift position to said lower speed shift position due to a balance between said governor pressure and said throttle modulated pressure; and a manual shift valve which is operated by hand to apply oil pressure to a particular element or elements of said friction engaging means and to apply a restriction to a selected one of said speed shift valves. Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
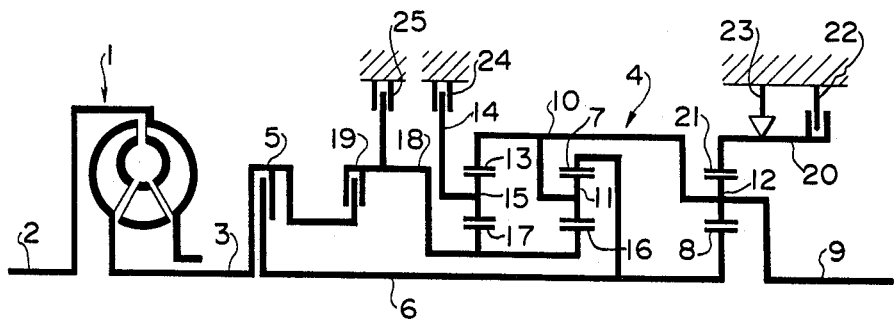
FIG. 1 is a diagrammatical view of an example of an automatic transmission system which includes a fluid torque converter, a transmission gear and friction engaging means for establishing a selected transmission engagement in said transmission gear.

Referring to FIG. 1, 1 designates a conventional fluid torque converter which is well known in the art, having an input shaft 2 and an output shaft 3. The input shaft 2 is sometimes called a pump shaft which is directly connected to an output shaft, generally the crank shaft of an engine (not shown). The output shaft 3 is sometimes called a turbine shaft and is directly connected to a driving member of a front clutch 5 in a subsequent transmission gear 4. A driven member of the front clutch 5 is carried by a first intermediate shaft 6, which also supports a ring gear 7 and a sun gear 8. Said ring gear 7 and sun gear 8 mesh with planetary pinions 11 and 12, respectively, which are carried by a carrier 10 formed as a unitary member with an output shaft 9. The carrier 10 further supports another ring gear 13 which meshes with planetary pinions 15 (only one is shown) which are carried by a carrier 14. The planetary pinions 11 and 15 mesh with sun gears 16 and 17 respectively, which are supported by a second intermediate shaft 18. The shaft 18 also supports a driven member of a rear clutch 19, said driven member being adapted to be driven by a driving member which is formed as a unitary body with the driving member of the front clutch 5. The planetary pinions 12 (only one is shown) mesh with a ring gear 21 supported by a rotary frame 20. The rotation of said rotary frame is selectively braked by a first-reverse brake 22. The rotary shaft 20 is further engaged with a one-way clutch 23 which allows for the rotation of said rotary shaft in one direction while preventing the rotation of the rotary shaft in the opposite direction. The rotation of the carrier 14 is selectively braked by a second brake 24. The rotation of the intermediate shaft 18 is selectively braked by a third brake 25.

The transmission gear having the abovementioned constitution operates as follows:

D range, 1st speed . . . The front clutch 5 is engaged and the first-reverse brake 22 is actuated. The rotation of the shaft 3 (assumed as clockwise rotation) is transmitted through the intermediate shaft 6 to the sun gear 8 and drives the planetary pinions 12 counterclockwise around their own axis. Therefore, the ring gear 21 meshing with the planetary pinions 12 is applied with a rotational force in the counterclockwise direction. However, since the counterclockwise rotation of the ring gear and the rotary frame 20 which carries the ring gear is prevented by the one-way clutch 23, the planetary pinions 12 rotate as a whole clockwise while each rotates counterclockwise around its own axis, driving the carrier 10 and the output shaft 9 in the clockwise direction.

D range, 2nd speed . . . The front clutch 5 is engaged and the second brake 24 is actuated. The rotation of the turbine shaft 3 is transmitted through the intermediate shaft 6 to the ring gear 7 and drives the sun gear 16 in the counterclockwise direction by way of the planetary pinions 11. Thus, the sun gear 17 which is formed as a unitary body with the sun gear 16 is also driven counterclockwise, transmitting a driving force to the planetary pinions 15. Since the planetary pinions 15 and the carrier 14 which carries the planetary pinions is braked by the second brake 24 so as not to rotate as a whole, each planetary pinion 15 rotates around its own axis in the clockwise direction, thereby driving the ring gear 13 in the clockwise direction. Thus, the carrier 10 and the output shaft 9 is driven in the clockwise direction. At this time, the rotary frame 20 rotates freely in the direction in which the one-way clutch 23 slides.

D range, 3rd speed . . . The front clutch 5 is engaged and the third brake 25 is actuated. The rotation of the turbine shaft 3 is transmitted through the intermediate shaft 6 to the ring gear 7, which would drive the sun gear 16 by way of the planetary pinions 11. However, since the rotation of the sun gear 16 carried by the intermediate shaft 18 is prevented by the third brake 25, each planetary pinion 11 rotates around its own axis in the clockwise direction, rotating as a whole around the sun gear 16 in the clockwise direction. Thus, the carrier 10 which carries the planetary pinions 11 and the output shaft 9 are driven in the clockwise direction.

D range, 4th speed . . . The front clutch 5 and the rear clutch 19 are engaged. In this condition, the intermediate shaft 6 and the sun gears 16 and 17 rotate as a unitary body, rendering the planetary gear mechanisms inoperable. Thus, the carrier 10 and the output shaft 9 rotate clockwise together with the turbine shaft 3.

R (reverse) range . . . The rear clutch 19 is engaged and the first-reverse brake 22 is actuated. The clockwise rotation of the turbine shaft 3 is transmitted through the intermediate shaft 18 to the sun gear 16, thereby driving the ring gear 7 counterclockwise by way of the planetary pinions 11. By the counterclockwise rotation of the ring gear 7, the sun gear 8 forming a unitary body with the ring gear 7 also rotates counterclockwise and would drive the rotary frame 20 in the clockwise direction by way of the planetary pinions 12. However, since the rotation of the rotary frame 20 is prevented by the first-reverse brake 22, each planetary pinion 12 rotates around its own axis in the clockwise direction therefore, rotating as a whole in the counterclockwise direction along the ring gear 21, thus driving the carrier 10 and the output shaft 9 in the counterclockwise direction.

L range (locked to 1st speed) . . . The front clutch 5 is engaged and the first-reverse brake 22 is actuated. This range is quite similar to the D range 1st speed in an engine drive condition wherein the driving power is transmitted from the turbine shaft 3 to the output shaft 9. However, by contrast to the D range 1st speed, in which the driving power is not transmitted from the output shaft 9 to the turbine shaft 3 as in the so-called engine brake operation due to the sliding of the one-way clutch, the L range allows for the transmission of the driving power from the output shaft 9 to the turbine shaft 3. However, there is a general difference between the D range 1st speed and the L range. In the oil pressure control system explained hereinafter, the first-reverse brake 22 is also actuated in the D range 1st speed and, therefore, the D range 1st speed is quite similar to the L range in this particular embodiment.

Table 1 shows the summary of various operational combinations of the clutches and brakes explained in the above.

|  | Front Clutch 5 | Rear Clutch 19 | First Brake 22 | Second Brake 24 | Third Brake 25 | Reverse Brake 22 | One-way Clutch 23 |
|---|---|---|---|---|---|---|---|
| D range 1st Speed | 0 |  | 0 |  |  |  | 0 |
| D Range 2nd Speed | 0 |  |  | 0 |  |  |  |
| D Range 3rd Speed | 0 |  |  |  | 0 |  |  |
| D Range 4th Speed | 0 | 0 |  |  |  |  |  |
| R Range |  | 0 |  |  |  | 0 |  |
| L Range | 0 |  | 0 |  |  |  | 0 |

Figure 2:
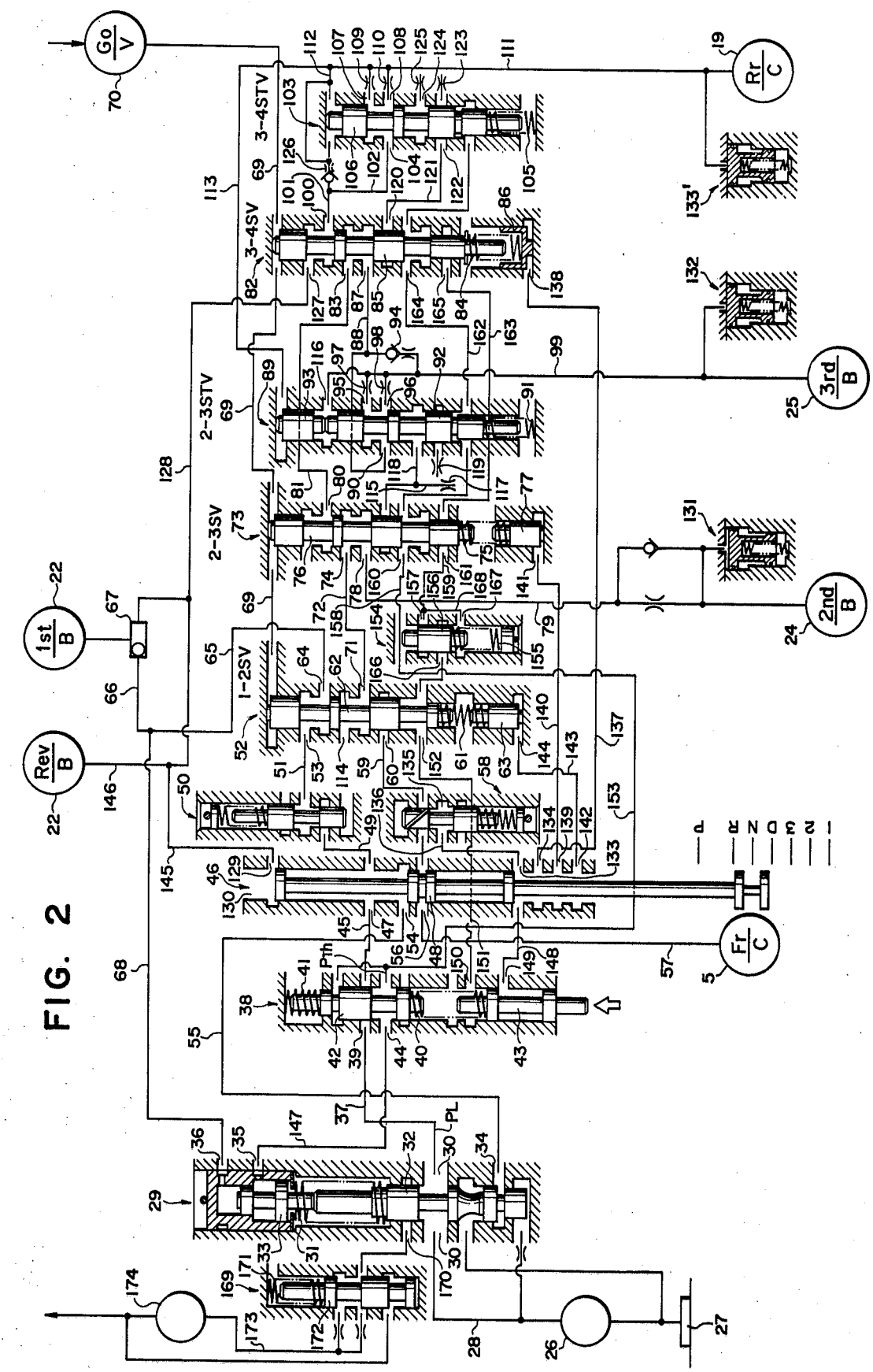
FIG. 2 is a diagram of an oil pressure control system incorporating the present invention for controlling the automatic transmission system shown in FIG. 1.

FIG. 2 is a diagram showing an oil pressure control system incorporating the present invention for selectively operating the abovementioned front clutch 5, rear clutch 19, first-reverse brake 22, second brake 24 and third brake 25 in order to establish a selected transmission engagement in the transmission gear.

Referring to FIG. 2, 26 designates an oil pump which pumps up oil from an oil reservoir 27 and generates oil pressure. The oil pressure is then transmitted through a passage 28 to a line pressure regulating valve 29, particularly to its port 30. The regulating valve 29 comprises a valve member 32 which is driven downward in the figure by a compression coil spring 31 and another valve member 33 which abuts against the valve member 32 from its upper end. The port 30 of the regulating valve 29 delivers a line pressure which is determined by the position of the valve member 32. The line pressure is regulated at a predetermined value according to regulating pressures applied to ports 34, 35 and 36 in a manner described hereinafter. The line pressure delivered from the port 30 is transmitted through a passage 37 to a port 39 of a throttle pressure regulating valve 38. The regulating valve 38 comprises a valve member 42 positioned by a balance between compression coil springs 40 and 41 and another valve member 43 which supports an end of the spring 40. The valve member 43 is applied with an upward force as shown in FIG. 2 at its lower end according to the magnitude of the engine torque or the opening of a throttle valve (not shown). Thus, a port 44 of the regulating valve 38 delivers a throttle pressure which is modulated from the line pressure according to the throttle opening. The line pressure supplied to the port 39 of the regulating valve 38 passes, on the other hand, through the port 39 to be transmitted through a passage 45 to a port 47 of a manual shift valve 46. The manual shift valve 46 comprises a valve member 48 which is shifted between P, R, N, D, 3, 2, and 1 ranges as shown in FIG. 2 by a manual shift lever (not shown). The line pressure supplied to the port 47 of the manual shift valve 46 is transmitted through a passage 49 to a pressure regulating valve 50 to further regulate the pressure and, thereafter, it is transmitted through a passage 51 to a port 53 of a 1-2 speed shift valve 52. The line pressure supplied to the port 47 of the manual shift valve 46 is further transmitted through a port 54 and a passage 55 to the port 34 of the line pressure regulating valve 29 when the valve member 48 is shifted to either the N, D, 3, 2 and 1 ranges. Furthermore, when the valve member 48 is shifted either to the D, 3, 2 and 1 ranges, the line pressure supplied to the port 47 of the manual shift valve 46 is transmitted through a port 56 and a passage 57 to the front clutch 5 and, simultaneously, through a passage 59 which includes a detent pressure regulating valve 58 to a port 60 of the 1-2 speed shift valve 52. The 1-2 speed shift valve 52 comprises a valve member 62 which is urged upward as shown in FIG. 2 by a compression coil spring 61 and a piston member 63 which supports one end of said compression coil spring. When the valve member 62 is shifted upward as shown in the figure, the oil pressure supplied to the port 53 of the valve 52 is transmitted through a port 64 and a passage 65 so as to be transmitted, on one hand, through a passage 66 and a switching element 67 to the first brake 22 while, on the other hand, transmitted through a passage 68 to the port 36 of the line pressure regulating valve 29.

An upper end face of the valve member 62 of the 1-2 speed shift valve 52 is supplied with a governor pressure which is transmitted through a passage 69 from a governor pressure regulating valve 70, said governor pressure increasing as the vehicle speed increases. When the vehicle speed has increased so that the governor pressure transmitted through the passage 69 traverses a predetermined level, the valve member 62 of the 1-2 speed shift valve 52 is shifted downward as shown in the figure. In this condition, the oil pressure transmitted from the passage 51 to the passage 65 by way of the ports 53 and 64 is intercepted while the oil pressure supplied to the port 60 from the passage 59 is transmitted through a port 71 and a passage 72 to a port 74 of a 2-3 speed shift valve 73. The 2-3 speed shift valve 73 comprises a valve member 76 urged upward by a compression coil spring 75 and a piston member 77 which supports one end of said coil spring. When the valve member 76 is shifted upward as shown in the figure, the line pressure supplied to the port 74 is transmitted through a port 78 and a passage 79 to the second brake 24. An upper end face of the valve member 76 of the 2-3 speed shift valve 73 is also applied with the governor pressure through the passage 69 so that when the governor pressure has increased beyond a level which is higher than that which causes the aforementioned shifting of the 1-2 speed shift valve 52, the valve member 76 is urged and shifted downward. When the valve member 76 is shifted downward, the supply of the line pressure from the port 74 to the port 78 is intercepted, while the line pressure is now transmitted from the port 74 to a port 80 so as to be transmitted through a passage 81 to a port 83 of a 3-4 speed shift valve 82.

The 3-4 speed shift valve 82 comprises a valve member 85 which is urged upward by a compression coil spring 84 and a cup-like piston member 86 which supports one end of said coil spring. When the valve member 85 is shifted upward as shown in the figure, the line pressure supplied to the port 83 is transmitted through a port 87 and a passage 88 to a port 90 of a 2-3 speed shift timing valve 89.

The 2-3 speed shift timing valve 89 comprises a valve member 92 urged upward by a compression coil spring 91 and a piston member 93 which abuts against an upper end of said valve member 92. The line pressure supplied to the port 90 through the passage 88 is transmitted to ports 95 and 96 (the line pressure cannot pass through a check valve 94) and, thereafter, it is transmitted through throttle means 97 and 98, respectively, so as to be transmitted through a passage 99 to the third brake 25.

An upper end face of the valve member 85 of the 3-4 speed shift valve 82 is also applied with the governor pressure through the passage 69 so that when the governor pressure has increased beyond a level which is higher than that which causes the aforementioned shifting of the 2-3 speed shift valve 73, the valve member 85 is urged and shifted downward. In this condition, the supply of the line pressure from the port 83 to the port 87 is intercepted, while the line pressure is transmitted from the port 83 to a port 100 and, thereafter, it is transmitted through oil passages 101 and 102 to a port 104 of a 3-4 speed shift timing valve 103. The 3-4 speed shift timing valve 103 comprises a valve member 106 urged upward by a compression coil spring 105. The line pressures supplied to the port 104 is transmitted through ports 107, 108 and throttle means 109, 110, respectively, to a passage 111 so as to be supplied to the rear clutch 19. Simultaneously, the line pressure established in the passage 111 is applied to an upper end face of the valve member 106 of the 3-4 speed shift timing valve through a passage 112 and, furthermore, it is applied to the upper end face of the piston member 93 of 2-3 speed shift timing valve.

The constitutions and operations of the above explained principal oil pressure circuits and other additional circuits will be explained in more detail hereinbelow with reference to respective operational ranges:

D range . . . The valve member 48 of the manual shift valve 46 is shifted to D position. The line pressure supplied to the port 47 of the manual shift valve 46 is, on one hand, transmitted through a passage 49, pressure regulating valve 50 and passage 51 to the port 53 of the 1-2 speed shift valve 52, wherefrom it is transmitted through the port 64, passages 65 and 66 and switching element 67 while switching same rightward to the first brake 22 thereby actuating the first brake. On the other hand, the line pressure supplied to the port 47 is transmitted through the port 56 and the passage 57 to the front clutch 5, thereby engaging the clutch. Thus, the transmission gear is set to the 1st speed transmission. When an accelerating pedal is depressed, the engine increases its output and finally the automobile proceeds to move, thereafter gradually increasing its speed. When the vehicle speed has reached a predetermined level, the governor pressure supplied through the passage 69 reaches a predetermined level, whereby the valve member 62 of the 1-2 speed shift valve is shifted downward. Now, the port 53 is closed and the oil pressure which has been supplied to the port 64 is now drained through a port 114. Thus, the first brake 22 is released. On the other hand, the line pressure which has been supplied to the port 60 is now transmitted through the port 71 and the passage 72 to the 2-3 speed shift valve 73 so as to be transmitted through its port 74 and 78 toward the second brake 24 thereby actuating the second brake. Thus, the transmission gear is now set to the 2nd speed condition. If the vehicle speed further increases so that the governor pressure supplied through the passage 69 reaches a second predetermined level, the valve member 76 of the 2-3 speed shift valve 73 is shifted downward. Then, the line pressure which has been transmitted through the ports 74 and 78 is now intercepted and the line pressure which has been maintained in the passage 79 is now drained through a passage 115. Simultaneously, the line pressure supplied to the port 74 is now transmitted to the port 80, wherefrom it is transmitted through the passage 81 to the port 83 of the 3-4 speed shift valve 82. From the port 83, the line pressure is further transmitted through the port 87 and the passage 88 to the port 90 of the 2-3 speed shift timing valve 89, wherefrom it is further transmitted through the ports 95, 96 and throttle means 97, 98 so as to be transmitted through the passage 99 to the third 2nd 25. At this time, when the line pressure is transmitted through the two ports 95 and 96 and throttle means 97, 98, the transmission of oil pressure is effected relatively swiftly. However, as oil pressure is gradually established in the passage 99, the oil pressure is transmitted through a passage 116 to an upper end face of the valve member 92, whereby the valve member 92 is gradually driven downward until it finally closes the port 95. Thus, by the provision of the 2-3 speed shift timing valve, in an early period of shifting from 2nd speed to 3rd speed, the supply of oil pressure to the third brake 25 is effected swiftly so as to make the brake approach swiftly to its operating position and, when the braking action initiates, the rate of supply of oil pressure is reduced, thereby accomplishing smooth brake engagement. On the other hand, in the second brake 24, which is released by shifting from 2nd speed to 3rd speed, the oil pressure maintained in the passage 79 is drained through the passage 115 when the valve member 76 is shifted downward. In this case, by the provision of a throttle means 117 in the passage 115, the second brake is released relatively slowly in its early period of releasing. However, when the valve member 92 of the 2-3 speed shift timing valve 89 is shifted downward, a second drain passage extending through a passage 118, the regulating valve 89 and a throttle means 119 is established in parallel with the passage 115. Then, the releasing of the second brake is thereafter effected swiftly. Thus, in the shifting from 2nd speed to 3rd speed, the second brake is smoothly disengaged while the third brake is smoothly engaged.

If the vehicle speed further increases so that the governor pressure supplied through the passage 69 exceeds a third predetermined level, the valve member 85 of the 3-4 speed shift valve 82 is driven and shifted downward. The supply of the line pressure through the ports 83 and 87 is now intercepted and the oil pressure maintained in the passage 99 connected to the third brake 25 is released through the check valve 94 and the passage 88 toward the port 87 of the 3-4 speed shift valve, wherefrom it is further released through a port 120 and a passage 121 toward a port 122 of the 3-4 speed shift timing valve 103, wherefrom it is drained through a throttling means 123. On the other hand, the line pressure supplied to the port 83 of the 3-4 speed shift valve is transmitted through the port 100 and the passages 101, 102 to the port 104 of the 3-4 speed shift timing valve 103, wherefrom it is transmitted through the ports 107, 108, throttle means 109, 110 and a passage 111 to the rear clutch 19. In this case, since the oil pressure is transmitted through the two ports 107, 108 and throttle means 109, 110, the supply of oil pressure to the rear clutch 19 is effected swiftly in an early period of shifting. However, as oil pressure is established in the passage 111, the oil pressure is applied to the upper end face of the valve member 106 thereby urging the valve member downward until it finally closes the port 107. After the port 107 has been closed, the oil supply to the rear clutch is effected only through the throttle means 110. Thus, the rate of oil pressure transmission is reduced thereby effecting slow operation of the rear clutch in its final stage of engagement. Thus, smooth engagement of the rear clutch is accomplished.

On the other hand, in an early period of shifting from 3rd speed to 4th speed, the oil pressure in the third brake is drained through the port 122 of the 3-4 speed shift timing valve and the throttle means 123 in a relatively low rate. However, after the valve member 106 has been shifted downward as described above, the port 112 is also opened to a port 124, whereby an additional drain passage through a throttle means 125 is established. In this condition, the third brake is swiftly released. Therefore, in the shifting from 3rd speed to 4th speed, it is also accomplished that the third brake is slowly released while the rear clutch 19 is swiftly approached to its engaging position in an early period of shifting and, thereafter, the rear clutch is slowly engaged while the third brake is swiftly released thereby accomplishing smooth shifting.

When the 3-4 speed shift valve 82 is again shifted upward as shown in the figure due to a lowering of the vehicle speed when the vehicle is moving with the transmission system shifted to 4th speed, the rear clutch 19 is released in a reversed manner when compared with the abovementioned shifting from 3rd speed to 4th speed by operation of the 3-4 speed shift timing valve 103 so that the clutch is released slowly in an early period of shifting through the throttle means 110, passage 112 and throttle means 126 and, thereafter, it is released swiftly through an additional passage including the throttle means 109 as the valve member 106 is shifted upward. In this case, the oil is exhausted through a port 127 of the 3-4 speed shift valve 82, a passage 128, a port 129 of the manual shift valve 46 and a drain port 130 of the manual shift valve. In this downshifting to 3rd speed, the valve member 92 of the 2-3 speed shift timing valve 89 is initially maintained at its downward shifted position due to the oil pressure acting on the rear clutch 19, said pressure being applied to the upper end face of the piston member 93 through the passage 113, whereby the third brake 25 is slowly supplied with the line pressure only through the port 96 and the throttle means 98 in an early period of the shifting. As the rear clutch 19 is released, the oil pressure applied to the upper end face of the valve member 93 is also released. However, at this time, the oil pressure established in the passage 99 acts onto the upper end face of the valve member 92 thereby maintaining the valve member 92 at its downward shifted position. In this case, therefore, the third brake is slowly actuated throughout its engaging process thereby avoiding any shock by downshifting. Further downshifting from 3rd speed to 2nd speed and from 2nd speed to 1st speed due to the lowering of the vehicle speed are performed in a manner reverse to those in the abovementioned upshifting.

Furthermore, the second brake 24, third brake 25 and rear clutch 19 are respectively provided with accumulators 131, 132 and 133' attached to their oil supply passages 79, 99 and 111 in order to further reduce the shock in the operation of these engaging means in up or down shifting. These accumulators are each a piston-cylinder means loaded with a spring means, the buffering operation of these accumulators being obvious to those skilled in the art.

3 range . . . The manual shift valve 46 is shifted to the 3 position. In this condition, the port 47 and 56 of the manual shift valve 46 are supplied with the line pressure as in the D range and the 1-2 speed shift valve 52 and the 2-3 speed shift valve 73 operate in the same manner as explained hereinabove with reference to the D range. However, in this 3 range, ports 133 and 134 of the manual shift valve 46 are effectively connected. The port 133 is supplied with the detent pressure through a passage 136, said detent pressure appearing at a port 135 of the detent pressure regulating valve 58 when the line pressure is supplied to the passage 59 from the port 56 of the manual shift valve. Therefore, the detent pressure is transmitted through the port 134 and a passage 137 to a port 138 of the 3-4 speed shift valve 82, thereby driving the piston member 86 upward, forcibly maintaining the valve member 85 of the 3-4 speed shift valve at its upward shifted position as shown in the figure. Therefore, when the manual shift valve is shifted to the 3 range, shifting of the transmission gear to 4th speed does not occur even when the governor pressure in the passage 69 has risen beyond a predetermined level according to an increase in the vehicle speed.

2 range . . . The valve member of the manual shift valve 46 is shifted to the 2 position. In this condition, the detent pressure supplied to the port 133 is also supplied to a port 139. The detent pressure supplied to the port 139 is transmitted through a passage 140 to a port 141 of the 2-3 speed shift valve 73, thereby driving the piston member 77 upward, forcibly maintaining the valve member 76 at its upward shifted position as shown in the figure. Therefore, when the manual shift valve is shifted to the 2 range, shifting of the transmission speed to 3rd speed does not occur even when the governor pressure in the passage 69 has risen beyond a predetermined level according to an increase in the vehicle speed.

1 range . . . The valve member 48 of the manual shift valve 46 is shifted to the 1 position. In this condition, the detent pressure supplied to the port 133 is further supplied to a port 142, wherefrom it is transmitted through a passage 143 to a port 144 of the 1-2 speed shift valve. Therefore, the piston member 63 is driven upward thereby forcibly maintaining the valve member 62 at its upward shifted position as shown in the figure. Therefore, when the manual shift valve is shifted to the 1 range, shifting of the transmission system to 2nd speed does not occur even when the governor pressure in the passage 69 has risen beyond a predetermined level according to an increase in the vehicle speed.

R range . . . The valve member 48 of the manual shift valve 46 is shifted to the R position. In this condition, the port 56 is isolated from the port 47. Therefore, the line pressure is not supplied to the passage 57. The passage 59 and its subsequent lines are not supplied with the line pressure either. In this shifting condition the line pressure supplied to the port 47 of the manual shift valve 46 is transmitted through the port 129, passages 145 and 146 to the reverse brake 22 for actuating the reverse brake and, simultaneously, it is transmitted through the passage 128 and the switching element 67 to the first brake 22 for actuating the first brake. Furthermore, the line pressure is transmitted through the passage 128 to the port 127 of the 3-4 speed shift valve 82, wherefrom it is further transmitted through the passages 101 and 102 to the port 104 of the 3-4 speed shift timing valve 103 so as to be transmitted through the passage 111 to the rear clutch 19 for engaging the rear clutch.

N range . . . The valve member 48 of the manual shift valve 46 is in its N position as shown in the figure. In this condition, the passages 57 and 59 are not supplied with the line pressure. Therefore, the front clutch 5 is not engaged with the circuit because the passage 59 is not operated. The line pressure supplied to the port 47 is transmitted through the passages 49, 51, 65 and 66 to the first brake 22.

P range . . . The valve member 48 of the manual shift valve 46 is shifted to the P position. In this shift position, the port 47 is blocked. Therefore, the subsequent system is not operated.

As previously mentioned, the port 34 of the line pressure regulating valve 29 is connected to the port 54 of the manual shift valve 46 through the passage 55, whereby the port 34 is supplied with the line pressure when the manual shift valve is shifted to either N, D, 3, 2, and 1 ranges. The line pressure supplied to the port 34 acts to urge the valve member 32 of the line pressure regulating valve upward thereby acting to reduce the line pressure. The port 35 of the line pressure regulating valve is supplied with the throttle pressure which appears at the port 44 of the throttle pressure regulating valve 38 through a passage 147. The throttle pressure supplied to the port 35 drives the valve member 32 downward, thereby increasing the line pressure according to the increase of the throttle pressure. The port 36 of the line pressure regulating valve is connected to the passage 66 by the passage 68 so that it is supplied with the same oil pressure which is supplied to the first brake 22 through the passages 65 and 66. The oil pressure supplied to the port 36 drives the valve member 32 downward thereby increasing the line pressure. Therefore, the line pressure which appears at the port 30 of the line pressure regulating valve 29 gradually increases according to the increase of the throttle pressure supplied to the port 35, i.e., depressing an accelerating pedal while it is steppedly changed by a substantial amount according to the on-off combinations of the line pressure supplied to the ports 34 and 36. In more detail, when the port 36 is supplied with the oil pressure while the port 34 is not supplied with any oil pressure, the line pressure becomes the highest. By contrast, when the port 34 is supplied with the oil pressure while the port 36 is not supplied with any oil pressure, the line pressure becomes the lowest. When both or neither of the ports 34 and 36 are supplied with oil pressure, the line pressure becomes medium. The condition that the port 36 alone is supplied with the oil pressure occurs when the manual shift valve 46 is shifted to the R position. By contrast, the condition that the port 34 alone is supplied with the oil pressure occurs when the manual shift valve 46 is shifted to either of D, 3 and 2 ranges wherein furthermore, the transmission system is in either of 2nd, 3rd and 4th speed conditions. In the other shifting conditions, both or neither of the ports 34 and 36 are supplied with oil pressure.

Figure 3:
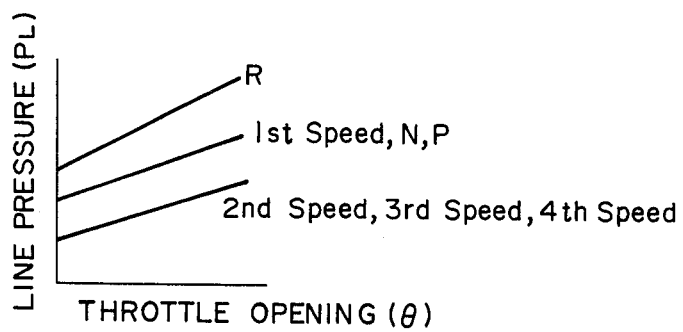
FIG. 3 is a graph showing the performance of the line pressure obtained in the oil pressure control system shown in FIG. 2, in relation to the throttle opening; and, FIG. 4 is a graph showing the performance of the throttle pressure and throttle modulated pressure in relation to the throttle opening.

Thus, the line pressure alters in three stepped levels according to the shifting conditions of the transmission system and in each stepped condition, it gradually increases as the throttle pressure increases. Such a performance of the line pressure is shown in FIG. 3. Since the highest transmission torque is required in the R range, the highest line pressure as shown in FIG. 3 meets with this requirement. The 1st speed transmission requires the second highest pressure, this requirement being satisfied by the intermediate level of the line pressure as shown in FIG. 3. The 2nd, 3rd and 4th speed transmission require only a relatively low torque and, accordingly, the line pressure is made to be at the lowest level as shown in FIG. 3, thereby reducing power loss.

As previously mentioned, the detent pressure regulating valve 58 generates the detent pressure at its port 136, said detent pressure being modulated from the line pressure existing in the passage 59. When the manual shift valve 46 is shifted to the 3, 2 and 1 ranges, the detent pressure is transmitted through the ports 134, 139 and 142 and passages 137, 140 and 143 to the ports 138, 141 and 144 of the 3-4 speed shift valve 82, the 2-3 speed shift valve 73 and the 1-2 speed shift valve 52, respectively, thereby maintaining the valve members of these speed shift valves at their upward shifted positions against the governor pressure. Therefore, when the manual shift valve 46 is shifted to the 3, 2 or 1 range, shifting to a higher speed range beyond the set range is prevented, thereby allowing for an increased rate of acceleration or deceleration. However, in order to accomplish an increased rate of acceleration or deceleration required in normal operation, it is sufficient if the speed shift points to the 1-2, 2-3 and 3-4 speed shift valves are shifted to higher points by a predetermined amount when compared with those effected in the D range operation by the manual shift valve 46 being shifted to the 3, 2 or 1 range. In other words, it is unfavorable that the shifting of the speed shift valve is locked regardless of a high increase in the rate of acceleration or deceleration since, in that case, for example, an excessively high rotation of the engine will be caused on a steep downhill slope. For this purpose, the detent pressure which drives the valve members of the 1-2, 2-3 and 3-4 speed shift valves to their lower speed shift positions against the governor pressure is properly modulated by the detent pressure regulating valve 58 so that when the manual shift valve is shifted to the 3, 2 or 1 range, the speed shift points are shifted toward a higher speed range by a suitable amount. The detent pressure generated in the passage 136 is supplied to a port 149 of the throttle pressure regulating valve 38. By this arrangement, when the accelerating pedal has been fully depressed, the detent pressure supplied to the port 149 is transmitted to a port 150 due to a large displacement of the valve member 43 of the throttle pressure regulating valve 38, whereby the detent pressure is transmitted through a passage 151 to a port 152 of the 1-2 speed shift valve 52, thereby forcibly driving the valve member 62 thereof upwardly against the governor pressure. Thus, the transmission gear is shifted to 1st speed. This action is called "kickdown".

Figure 4:
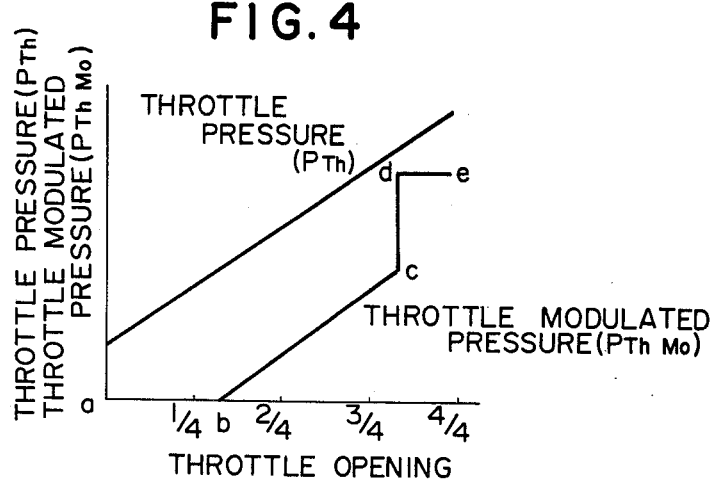

The throttle pressure generated at the port 44 of the throttle pressure modulating valve 38 is transmitted through a passage 153 to a throttle pressure modulating valve 154. The throttle pressure modulating valve comprises a valve member 156 driven upward by a compression coil spring 155. When the throttle pressure is low corresponding to a small throttle opening, the valve member 156 is driven upward by the compression force of the spring 155 thereby closing a port 157, so that no substantial oil pressure is generated. However, as the throttle pressure gradually increases, the valve member 156 is driven downward against the spring 155 thereby opening the port 157, whereby a throttle modulated pressure is generated, which increases according to an increase of the throttle pressure. The throttle pressure supplied from the passage 153 and the throttle modulated pressure generated at the port 157 are transmitted through passages 158 and 159 to ports 160 and 161 of the 2-3 speed shift valve 73, respectively, and furthermore, they are transmitted through passages 162 and 163 to ports 164 and 165 of the 3-4 speed shift valve 82. This combination of the throttle pressure and the throttle modulated pressure operates in a manner that in the upshift of the 2-3 speed shift valve 73 and the 3-4 speed shift valve 82, a higher pressure, i.e. the throttle pressure counteracts the governor pressure while in the downshift of said speed shift valves, a lower pressure, i.e., the throttle modulated pressure counteracts the governor pressure, thus giving a hysterisis to the shifting position of said speed shift valves so as to obtain stability in the shifting operation in the vicinity of the shifting point. When the accelerating pedal has been fully depressed (kickdown), the detent pressure which appears at the port 150 of the throttle pressure regulating valve 38 is transmitted through the passage 151 to a port 166 of the throttle pressure modulating valve 154 thereby driving the valve member 156 upward to transmit the detent pressure through a port 167 and passages 168, 159 and 163 to the ports 161 and 165 of the 2-3 speed shift valves 73 and the 3-4 speed shift valves 82 thereby effecting downshift of these speed shift valves. The performance of the throttle modulated pressure effected by the throttle pressure modulating valve 154 is shown in relation to the throttle pressure in FIG. 4. In this figure, the abrupt rise of the throttle modulated pressure from point *c* to point *d* is due to the kickdown.

Number 169 designates a torque converter pressure regulating valve which regulates the oil pressure supplied from a port 170 of the line pressure regulating valve 29, said regulating operation being effected by a valve member 172 exerted with spring force by a compression coil spring 171. The oil is then passed through a passage 173 and an oil cooler 174 to the torque converter which is not shown in FIG. 2.

The invention being thus described, it will be obvius that the same may be varied in many ways. Such variations are not to be regarded as a departure from the spirit and scope of the invention, and all such modifications as would be obvious to one skilled in the art are intended to be included within the scope of the following claims.

1. An oil pressure control system for an automatic transmission system which includes a fluid torque converter, a transmission gear and friction engaging means for establishing a selected transmission engagement in said transmission gear, comprising:

a source of oil pressure;

a line pressure regulating valve which generates a line pressure from the oil pressure of said source, said line pressure being regulated to be suitable for operating said friction engaging means;

a throttle pressure regulating valve which generates a throttle pressure from said line pressure, said throttle pressure increasing as the engine torque increases;

a governor pressure regulating valve which generates a governor pressure from said line pressure, said governor pressure increasing as the vehicle speed increases;

a throttle pressure modulating valve which generates a throttle modulated pressure from said throttle pressure, said throttle modulated pressure being lower than said throttle pressure by a determined amount;

a manual shift valve for shifting speed ranges; and a plurality of speed shift valves which are shifted between lower and higher speed shift positions for changing over supply of oil pressure to said friction engaging means for shifting transmission between lower and higher speed stages, said speed shift valve having a valve element and first, second and third port means for exerting shifting fluid pressures to said valve element, said first, second and third port means being supplied with said governor pressure, throttle pressure and throttle modulated pressure respectively, wherein said valve element is shifted from said lower speed shift position to said higher speed shift position due to a balance between said governor pressure supplied to said first port means and said throttle pressure supplied to said second port means while said third port means is intercepted and is shifted from said higher speed shift position to said lower speed shift position due to a balance between said governor pressure supplied to said first port means and said throttle modulated pressure supplied to said third port means while said second port means is intercepted.

2. An oil pressure control system for an automatic transmission system which includes a fluid torque converter, a transmission gear and friction engaging means for establishing a selected transmission engagement in said transmission gear, comprising:

a source of oil pressure;

a line pressure regulating valve which generates a line pressure from the oil pressure of said source, said line pressure being regulated to be suitable for operating said friction engaging means;

a throttle pressure regulating valve which generates a throttle pressure from said line pressure, said throttle pressure increasing as the engine torque increases;

a governor pressure regulating valve which generates a governor pressure from said line pressure, said governor pressure increasing as the vehicle speed increases;

a throttle pressure modulating valve which generates a throttle modulated pressure from said throttle pressure, said throttle modulated pressure being lower than said throttle pressure by a determined amount;

a manual shift valve for shifting speed ranges; and a plurality of speed shift valves which are shifted between lower and higher speed shift positions for changing over supply of oil pressure to said friction engaging means for shifting transmission between lower and higher speed stages, said speed shift valve comprising a valve member, said valve member being shifted between first and second shift positions to control first, second, third, fourth, fifth and sixth ports, said first port connecting to a first one of said friction engaging means which is actuated for establishing a lower speed stage transmission and being supplied with the line pressure when said valve member is shifted to said first shift position while said first port being isolated from supply of the line pressure and connected to said second port when said valve member is shifted to said second shift position, said second port connecting to a drain passage, said third port connecting to a second one of said friction engaging means and being supplied with the line pressure when said valve member is shifted to said second shift position while said third port being isolated from supply of the line pressure and connected to said fourth port when said valve member is shifted to said first shift position, said fourth port connecting to a drain passage, said valve member comprising first and second land portions presenting first and second end faces oppositely arranged as exposed to a common chamber, said first end face being larger than said second end face, said first land portion controlling said fifth port in a manner to open said port toward said common chamber when said valve member is shifted to said first shift position while said first land portion isolating said fifth port from said chamber when said valve member is shifted to said second shift position, said second land portion controlling said sixth port in a manner to open said port toward said common chamber when said valve member is shifted to said second shift position while said second land portion isolating said sixth port from said chamber when said valve member is shifted to said first shift position, said first end face of said first land portion being applied with a force from pressure existing in said common chamber, said force acting in a first direction to urge said valve member toward said first shift position, said fifth port being supplied with said throttle pressure while said sixth port being supplied with said throttle modulated pressure, said valve member further being applied with said governor pressure at its one end, said governor pressure driving said valve member in a second direction opposite to said first direction.

3. The oil pressure control system of claim 1, wherein said transmission gear includes a plurality of planetary gear mechanisms each comprising planetary gear components such as a sun gear, a ring gear, a plurality of planetary pinions and a carrier which carries said planetary pinions, and said friction engaging means includes a plurality of clutches and brakes, said clutch being adapted to connect a selected one of said planetary gear components to an input power shaft while said brake being adapted to brake a selected one of said planetary gear components against rotation.

4. The oil pressure control system of claim 3, wherein said transmission gear provides for four speed forward drive transmissions and a reverse drive transmission; said clutches include a front clutch, a rear clutch and a one-way clutch; and said brakes include a first-reverse brake, a second brake and a third brake wherein said front clutch and said first-reverse brake and said one-way clutch are actuated for 1st speed transmission; said front clutch and said second brake are actuated for 2nd speed transmission; said front clutch and said third brake are actuated for 3rd speed transmission; said front and rear clutches are actuated for 4th speed transmission; and said rear clutch and said first-reverse brake are actuated for reverse drive transmission.

5. The oil pressure control system of claim 1, wherein said throttle pressure modulating valve comprises a valve member which controls a release port for the throttle pressure, said release port generating said throttle modulated pressure, said valve member being applied with said throttle pressure at one end thereof to be driven thereby in a first direction to open said release port and applied with said throttle modulated pressure and a spring force at the other end thereof to be driven thereby in a second direction opposite to said first direction.

6. The oil pressure control system of claim 2, wherein said valve member of said speed shift valve is applied with a spring force which drives said valve member in said first direction thereby resiliently driving said valve member toward said first shift position, said spring force being applied by a compression coil spring which supports one end of said valve member.

7. The oil pressure control system of claim 6, wherein the other end of said compression coil spring is supported by a piston member which is shiftable in said first direction to compress said coil spring, said piston member being selectively shifted in said second direction by oil pressure selectively supplied through said manual shift valve.

8. The oil pressure control system of claim 1, wherein said line pressure regulating valve provides for three substantially different line pressure levels according to the shifting conditions of said plurality of speed shift valves and said manual shift valve, said line pressure being at a highest level when said manual shift valve is shifted to R range, a medium level when said manual shift valve is shifted to P, N or D, 3, 2 or 1 range and said speed shift valves are shifted to establish 1st speed transmission, and a lowest level in the other shifting conditions.

9. The oil pressure control system of claim 8, wherein said line pressure regulating valve comprises a valve member which controls a release port for the line pressure, said valve member being basically positioned by a balance between the line pressure which drives said valve member in a first direction to open said release port and a spring force which drives said valve member in a second direction opposite to said first direction, said valve member being further selectively applied with the line pressure in said first direction through a first port, the throttle pressure in said second direction through a second port and a pressure modulated from the line pressure in said second direction through a third port according to the shifting conditions of said plurality of speed shift valves and said manual shift valve.

10. The oil pressure control system of claim 9, wherein said first port is connected to a first port in said manual shift valve, said latter mentioned first port being controlled by the valve member of said manual shift valve to be supplied with the line pressure when the manual shift valve is shifted to N, D, 3, 2 or 1 range, said second port of said line pressure regulating valve being connected to a main port of said throttle pressure regulating valve, said main port generating said throttle pressure, said third port of said line pressure regulating valve being connected to a second port of said manual shift valve by way of a pressure regulating valve and 1–2 speed shift valve, said second port of said manual shift valve being controlled by said valve member of the manual shift valve to be supplied with the line pressure when the manual shift valve is shifted to R, N, D, 3, 2 or 1 range, said 1–2 speed shift valve communicating the line pressure to said third port of said line pressure regulating valve when it is shifted to a position to accomplish 1st speed transmission.

11. The oil pressure control system of claim 1, wherein said throttle pressure regulating valve comprises a valve member which controls a release port for the line pressure, said release port generating said throttle pressure, said valve member being basically positioned by a balance between the throttle pressure which drives said valve member in a first direction to close said release port and a spring force which drives said valve member in a second direction opposite to said first direction, said spring force being adapted to be increased according to an increase in the throttle valve opening.

12. The oil pressure control system of claim 11, wherein said spring force is applied by a compression spring which is supported by a second valve member at one end thereof, said second valve member being displaced by a throttle valve operating mechanism to compress said spring according to an increase in the throttle valve opening.

* * * * *